United States Patent [19]

Mathiesen

[11] 3,894,287

[45] July 8, 1975

[54] TIME DELAY CIRCUIT FOR MODEMS

[75] Inventor: Odd Mathiesen, Oslo, Norway

[73] Assignee: International Standard Electric Corporation, New York, N.Y.

[22] Filed: Jan. 24, 1974

[21] Appl. No.: 436,241

[30] Foreign Application Priority Data

Apr. 13, 1973 Norway ............ 1543/73

[52] U.S. Cl. ............ 328/108; 307/231; 307/293; 328/37; 328/48; 328/119

[51] Int. Cl. ............ H03k 5/20

[58] Field of Search ......... 328/55, 108, 119, 37, 48; 307/231, 221, 247 R, 293

[56] References Cited

UNITED STATES PATENTS 2,985,715 5/1961 Campbell ............ 328/119
3,155,912 11/1964 Applebaum et al. ............ 328/108
3,453,551 7/1969 Haberle ............ 328/119

*Primary Examiner*—Stanley D. Miller, Jr.
*Attorney, Agent, or Firm*—John T. O'Halloran; Menotti J. Lombardi, Jr.; Vincent Ingrassia

[57] ABSTRACT

This invention relates to a time delay circuit for switching on and off modems used for data transmission over cables in local telephone networks. The time delay circuit comprises a shift register controlled by a signal pattern recognition circuit, to register signals representative of being information signals, a delay counter which is controlled to initiate a predetermined delay time at the occurrence of an information signal, and gating circuits controlled by said shift register and said delay counter to switch on the modem if solely information signals have been received during the delay time required by international conventions.

3 Claims, 4 Drawing Figures

TIME DELAY CIRCUIT FOR MODEMS

BACKGROUND OF THE INVENTION

The present invention relates to a time delay circuit for switching on and off modems used for data transmission over cables in local telephone networks. International conventions require that switching-on of on-line modems shall be delayed a certain time period after detection of the first information signal. Correspondingly, the on-line modem shall not be switched-off until a certain time period has lapsed after detection of a non-information signal, thus making allowance for noise signals.

When the modem is designed for reception at one transmission speed said requirements are rather easily satisfied by use of a single shift register. When, however, the modem is designed for reception at a large range of speeds, i.e. 600, 1200, 2400, 4800 and 9600 bits/sec., it will no longer be possible to use a single shift register. A further requirement is that during the predetermined time delay, there must be received information signals only.

SUMMARY OF THE INVENTION

It is an object of the present invention to provide a time delay circuit satisfying the requirements set forth hereinabove in a new and efficient manner.

According to a broad aspect of the invention, there is provided a time delay circuit for switching on and off a modem designed to handle multiple data transmission speeds comprising a signal pattern recognition circuit, an up/down shift register coupled to said pattern recognition circuit for registering signals representative of information signals and signals representative of non-information signals, a delay counter responsive to the contents of said shift register for initiating a predetermined delay at the initial occurrence of an information signal or a non-information signal, and a gating circuit coupled to said shift register and said delay counter for switching on said modem if only information signals have been received during the delay time and for switching off said modem if only non-information signals have been received during the delay time.

The above and other objects of the invention will be more clearly understood from the following detailed description taken in conjunction with the accompanying drawings, in which:

DESCRIPTION OF THE PREFERRED EMBODIMENT

Figures 1, 2:
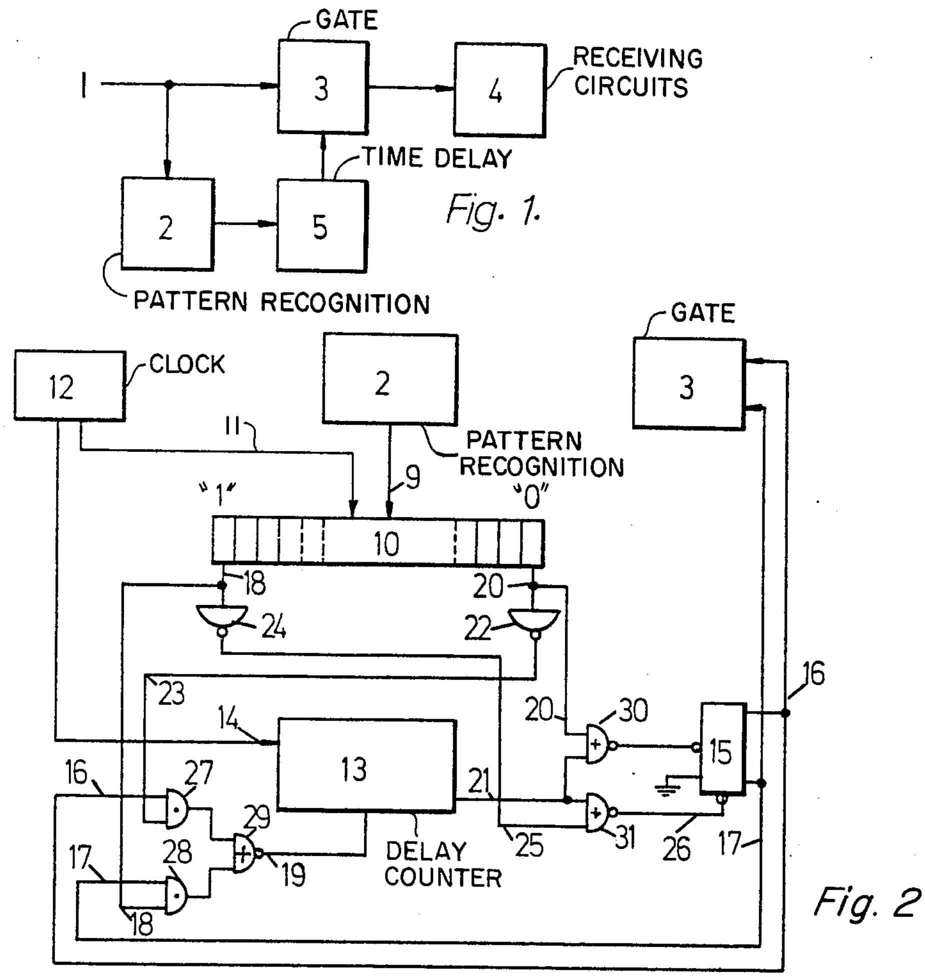
FIG. 1 is a block diagram illustrating how the inventive delay circuit is arranged to control the data flow.
FIG. 2 is a functional block diagram of the inventive delay circuit.

In FIG. 1 the incoming data signal is indicated at 1. At this stage, the signal has passed regeneration and timing circuits (not shown) and it usually has the form of a square wave signal, when being presented to a signal pattern recognition circuit 2 and a gate 3. The received signals will not be presented to the receiving circuits 4 unless the gate 3 is opened by a time delay circuit 5. The signal pattern recognition circuit 2, the gate

3 and the receiving circuits 4 are not part of the present invention and will not be described here.

However, as appears from its name, the signal pattern recognition circuit 2 compares all incoming signal patterns with a predetermined set of signal codes.

When coincidence is detected, the output from the recognition circuit will be at a state indicating that information signals have been received. If coincidence is not detected the output from the recognition circuit will be at its other state, indicating that noise or non-information signals have been received.

In FIG. 2, a mode control signal 9 from the recognition circuit 2 is presented to a shift register 10. This signal is chosen to be 0 only for data signal combinations which correspond to a selected code, while it is 1 if the input signal combination is not a selected one.

The inputs to the shift register 10 are chosen so that a 1 is shifted into the register from the left by a line clock pulse 11 from a clock pulse generator 12, when the mode control is 0. A 0 is shifted into the register from the right by the line clock pulse 11, when the mode control is 1. The frequency of the line clock pulse 11 is the same as that of the data signal. If information signals only are received, the register will be filled by 1s from the left to the right. If only non-information signals are received, the register will be filled with 0s from the right to the left. Normally, the register is full of 0s when only noise is received and it will be filled with 1s from the left as information is recognized. When transmission ceases, the register will again be filled with 0s from the right. Of course, noise may appear as 0s at the right during transmission and as 1s at the left during the idle period.

In order to maintain a constant delay time for the on- and off-switching of the modem, the shift register alone will be sufficient when the modem is designed to handle one single data transmission speed.

The present invention does, however, relate to a time delay circuit suitable for switching on and off a modem designed to handle multiple data transmission speeds.

The length of, or number of stages of, the shift register 10 is chosen so as to be suitable for a predetermined variety of data transmission speed.

In addition to the shift register, there is used a delay counter 13 which is activated by an appropriate clock frequency signal 14 from the clock pulse generator 12.

The shift register 10 and the delay counter 13 cooperate to control the on- and off- state of the modem via a flip-flop 15 and the gate 3. In the present embodiment of the invention the modem is off when the flip-flop output 17 is 1, and on when the flip-flop output 16 is 1.

The delay counter 13 is usually in the reset state, but starts counting as soon as the first left bit in the shift register 10 goes to 1 in the off-state of the modem - or as soon as the first right bit in the shift register 10 goes to 0 in the on-state of the modem.

The two modes of operation of the time delay circuit shall now be described in more detail.

Figure 3:
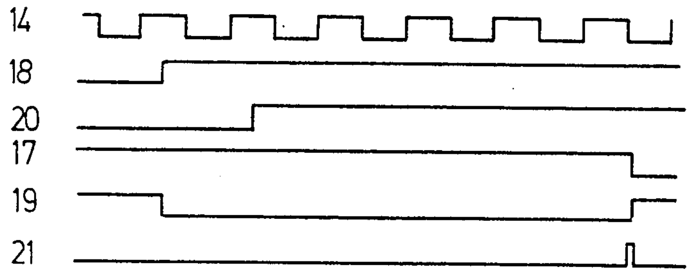
FIGS. 3 and 4 are timing diagrams of signals appearing in the circuit of FIG. 2.

Modem is in the off-state, i.e. output 16 is 0 and output 17 is 1. All bits in the shift register 10 are 0. Referring to FIGS. 2 and 3, when mode control 9 goes to 0, a 1 is fed into the shift register 10 from the left side by the line clock pulse 11, and line 18 goes to 1. Because 17 already is 1, a reset line 19 goes to 0 and the delay counter 13 starts counting. As information signals are received, the shift register 10 will be filled with 1s and the line 20 goes to 1. It will now be assumed that the flow of information signals are not interrupted, so that when the delay counter has finished counting, its output line 21 goes to 1. The input to the flip-flop 15 goes to 0 and the flip-flop changes state, i.e. line 16 becomes a 1. The modem is then switched on. Because line 17 now is 0, the reset line 19 goes to 1 and the delay counter 13 is reset.

Figure 4:
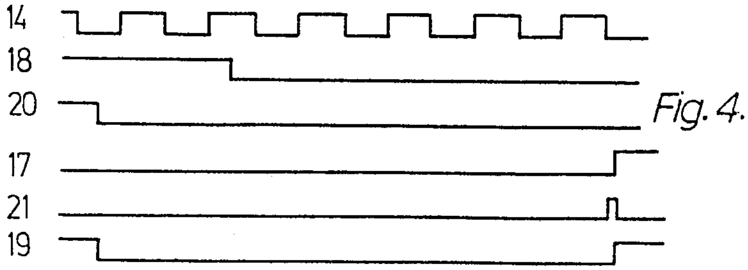

Now, the modem is in the on-state, i.e. output 16 is 1 and output 17 is 0. All bits in the shift register are 1. Referring to FIGS. 2 and 4, when mode control 9 goes to 1, a 0 is fed into the shift register 10 from the right side, by the line clock pulse 11 and the line 20 goes to 0. After an inverter 22, the signal 23 goes to 1. Because line 16 already is 1, the reset line 19 goes to 0, and the delay counter 13 starts counting. As non-information signals are received, the shift register 10 will be filled with 0s and the line 18 goes to 0. After an inverter 24, the signal 25 goes to 1.

It will now be assumed that the flow on non-information signals is not interrupted, so that when the delay counter 13 a short while later has finished counting, its output line 21 goes to 1. The reset input 26 to the flip-flop 15 goes to 0 and the flip-flop changes state to 16 = 0. The modem is then switched off. Because 16 now is 0, the reset line 19 goes to 1 and the delay counter 13 is reset.

If by chance errors appear in the data stream, the mode control line 9 would change state for a short period and the delay counter 13 would start counting toward the off-state of the modem. If, however, this error time period is so short that the shift register 10 reaches back to its original state before the delay counter 13 has finished counting, the delay counter 13 will be reset again before its output 21 changed state to 1, and errors in the data will normally not affect the state of the modem.

Similarly, bursts of noise signals received during the off-state of the modem may simulate information signals, but the delay counter 13 will be reset as soon as a non-information combination is detected on the left side of the shift register.

In the above detailed description of one embodiment of the invention, the AND gates 27, 28 and NOR gates 29, 30 and 31 are not mentioned, it being understood that the gating circuitry may be varied in many ways.

It is to be understood that the foregoing description of specific examples of this invention is made by way of example only and is not to be considered as a limitation on its scope.

I claim:

1. A time delay circuit for switching on and off a modem designed to handle multiple data transmission speeds comprising:

a signal pattern recognition circuit;

an up/down shift register coupled to said pattern recognition circuit for registering signals representative of information signals and signals representative of non-information signals;

a delay counter responsive to the contents of said shift register for initiating a predetermined delay at the initial occurrence of an information signal or a non-information signal; and a gating circuit coupled to said shift register and said delay counter for switching on said modem if only information signals have been received during the delay time and for switching off said modem if only non-information signals have been received during the delay time.

2. A time delay circuit according to claim 1, wherein said shift register shifts its contents in one direction upon recognition of an information signal and in the opposite direction upon recognition of a non-information signal.

3. A time delay circuit according to claim 1, wherein said shift register includes a predetermined number of stages corresponding to a time period smaller than the delay generated by said delay counter.

* * * * *